US012421780B2

(12) United States Patent
Alber et al.

(10) Patent No.: US 12,421,780 B2
(45) Date of Patent: Sep. 23, 2025

(54) CRANK FOR WINDOW OPERATOR

(71) Applicants: Helmut Alber, Schlanders (IT); Rodney Robert Lake, Rockford, IL (US)

(72) Inventors: Helmut Alber, Schlanders (IT); Rodney Robert Lake, Rockford, IL (US)

(73) Assignee: HOPPE Holding AG, Müstair (CH)

(*) Notice: Subject to any disclaimer, the term of this patent is extended or adjusted under 35 U.S.C. 154(b) by 200 days.

(21) Appl. No.: 18/481,368

(22) Filed: Oct. 5, 2023

(65) Prior Publication Data

US 2025/0116146 A1 Apr. 10, 2025

(51) Int. Cl.
*E05B 1/00* (2006.01)
*E05F 11/10* (2006.01)

(52) U.S. Cl.
CPC .............. *E05F 11/10* (2013.01); *E05B 1/003* (2013.01); *E05B 2001/0076* (2013.01); *E05Y 2900/148* (2013.01)

(58) Field of Classification Search
CPC .. E05B 1/003; E05B 2001/0076; E05B 3/003; E05B 3/065; E05B 3/02;
(Continued)

(56) References Cited

U.S. PATENT DOCUMENTS 4,216,985 A * 8/1980 Sorensen .............. E05B 13/002 292/336.3
4,524,921 A * 6/1985 Ozaki .................. A01K 89/006 242/284
(Continued)

FOREIGN PATENT DOCUMENTS

CN 101668912 A * 3/2010 ........... E05B 1/0092
DE 4230580 C1 * 8/1993 .............. B60J 7/057
(Continued)

OTHER PUBLICATIONS https://www.amesburytruth.com/products/windows; known prior to Oct. 5, 2023.
(Continued)

*Primary Examiner* — Kristina R Fulton
*Assistant Examiner* — Steven A Tullia
(74) *Attorney, Agent, or Firm* — Reinhart Boerner Van Deuren P.C.

(57) ABSTRACT

A casement operator crank includes a base member, a handle, a hinged detent, and a resilient biasing member. The handle has a main body portion connects to the base member for rotation about a handle axis between an open orientation and a closed orientation. The hinged detent pivotally engages with the base member for rotation about a detent axis between a first orientation relative to the main body portion and a second orientation relative to the main body portion. The resilient biasing member acts between the hinged detent and the handle. The biasing member and hinged detent operably: a) bias the main body portion toward the open orientation about the handle axis when the main body portion is in the open orientation; and b) the main body portion toward the closed orientation about the handle axis when the main body portion is in the closed orientation.

29 Claims, 8 Drawing Sheets

(58) Field of Classification Search
CPC ..... E05B 2015/0437; E05B 2015/0486; E05B 2015/0493; E05F 11/10; E05F 11/16; E05F 11/34; Y10T 292/57; Y10T 292/282; Y10T 292/558; E05Y 2900/148; E05Y 2201/68; Y10S 16/90; Y10S 292/31
See application file for complete search history.

(56) References Cited

U.S. PATENT DOCUMENTS

| | | | | |
|---|---|---|---|---|
| 5,168,770 | A * | 12/1992 | Ellis | E05F 11/10 74/545 |
| D350,666 | S | 9/1994 | Wobschall et al. | |
| 5,400,473 | A * | 3/1995 | Delman | E05F 11/16 74/545 |
| 5,560,082 | A * | 10/1996 | Vetter | E05F 11/34 74/543 |
| 6,164,156 | A * | 12/2000 | Purcell | G05G 1/04 74/557 |
| 6,598,265 | B2 * | 7/2003 | Lee | E05B 5/003 16/110.1 |
| 7,066,505 | B2 | 6/2006 | Van Klompenburg et al. | |
| 7,147,256 | B2 | 12/2006 | Gill | |
| 7,194,930 | B2 * | 3/2007 | Dawson | E05B 1/0092 242/283 |
| 7,251,860 | B2 * | 8/2007 | Liang | E05F 11/16 74/547 |
| 7,941,898 | B2 * | 5/2011 | Liang | E05F 11/00 16/429 |
| 7,958,603 | B2 * | 6/2011 | Franco | E05B 5/003 292/202 |
| 8,776,437 | B2 | 7/2014 | Bourgoin | |
| 9,404,302 | B2 * | 8/2016 | Evensen | E05F 11/02 |
| D874,901 | S | 2/2020 | Vetter et al. | |
| D913,783 | S | 3/2021 | Nolte | |
| D930,465 | S | 9/2021 | Nolte et al. | |
| 2006/0260431 | A1 * | 11/2006 | Gill | E05B 1/0092 74/545 |
| 2007/0273162 | A1 | 11/2007 | Schultz | |
| 2008/0066382 | A1 * | 3/2008 | Erickson | E05B 13/10 49/246 |
| 2022/0341237 | A1 | 10/2022 | Dallmann et al. | |

FOREIGN PATENT DOCUMENTS

| | | | | | |
|---|---|---|---|---|---|
| EP | 0313125 | B1 | * | 12/1993 | B60J 7/057 |
| JP | 2929098 | B2 | * | 8/1999 | E05F 11/02 |
| NZ | 335475 | A | * | 9/2001 | G05G 5/06 |

OTHER PUBLICATIONS https://www.pella.com/ideas/windows/features-options/hardware/wood/; known prior to Oct. 5, 2023.
https://www.windowpartscenter.com/collections/casement-operators-and-parts; known prior to Oct. 5, 2023.

* cited by examiner

CRANK FOR WINDOW OPERATOR

FIELD OF THE INVENTION

This invention generally relates to casement windows and particular to cranks for casement window operators.

BACKGROUND OF THE INVENTION

Casement windows are a type of window that has a windowpane mounted to a frame that opens and closes by pivoting about a hinged axis. Typically, an operator arrangement including an operator and an operator crank is used to open and close the windowpane relative to the frame. The operator crank is typically rotated in a first direction to open the window and in an opposite second direction to close the window. Rotating the crank will drive one or more gears and/or linkages that will drive the windowpane between open and closed orientations relative to the frame. The crank is often mounted to an operator shaft that is operably coupled to the gears and/or linkages.

Some operator arrangements have the crank always in an operational orientation where a user can grasp and rotate the crank. Other operator arrangements employ a crank that can be transitioned between open and closed orientations. When in the open orientation, the crank can be rotated to drive the operator. When in the closed orientation, the gripping portion of the crank is typically hidden and the crank is prevented from rotating. The closed orientation, typically, provides a more aesthetic appearance such as when the crank and operator arrangement are not in use. The user can switch between the two orientations such as when it is desired to open or close a window.

For the crank configurations that can be transitioned between the open and closed orientations, it may be desirable to have mechanisms to maintain the crank in the particular orientation. Further, it is desirable that such a mechanism can be used repeatedly without undesirable wear in the mechanism.

The present application provides improvements over the current state-of-the-art cranks for casement window operator arrangements.

BRIEF SUMMARY OF THE INVENTION

Embodiments of the application provide a new and improved casement operator crank. The crank is configured to be mounted to a casement operator. In a particular example, the casement operator crank includes a base member, a handle, a hinged detent, and a resilient biasing member.

In an example, the base member is configured to connect to the casement operator. The handle has a main body portion. The main body portion pivotally connected to the base member for rotation about a handle axis between an open orientation and a closed orientation.

The hinged detent pivotally engages with the base member for rotation about a detent axis between a first orientation relative to the main body portion and a second orientation relative to the main body portion. The hinged detent is in the first orientation when the main body portion is in the open orientation. The hinged detent is in the second orientation when the main body portion is in the closed orientation.

The resilient biasing member acts between the hinged detent and the handle. The biasing member and hinged detent operably:

a) bias the main body portion toward the open orientation about the handle axis when the main body portion is in the open orientation; and
b) the main body portion toward the closed orientation about the handle axis when the main body portion is in the closed orientation.

In an example, the biasing member and hinged detent operably:

a) generate torque on the main body portion in a first direction about the handle axis biasing the main body portion toward the open orientation when the main body portion is moved away from the open orientation; and
b) generate torque on the main body portion in a second direction about the handle axis biasing the main body portion toward the closed orientation when the main body portion is moved away from the closed orientation.

In an example, the main body portion rotates about the handle axis in the second direction when transitioning from the open orientation to the closed orientation. The main body portion rotates about the handle axis in the first direction when transitioning from the closed orientation to the open orientation.

In an example, a slide member is slidably carried within a central cavity of the main body portion. The slide member pivotally engages with the hinged detent for pivotal motion therebetween about a slide member axis that is offset from the detent axis. The biasing member acts between the main body portion and the slide member. The slide member has:

- a first position relative to the main body portion when the main body portion is in the open orientation;
- a second position relative to the main body portion when the main body portion is in the closed orientation;
- a neutral position relative to the main body portion, the slide member passing through the neutral position when the main body portion transitions between the open and closed orientations.

In an example, when in the neutral position, the biasing member provides a maximum amount of force to the hinged detent but no torque is applied to the main body portion.

In an example, the hinged detent has a third orientation relative to the main body portion that corresponds to when the slide member is in the third position. Force applied by the biasing member to the hinged detent increases as the hinged detent transitions from the first orientation to the third orientation as the slide member transitions from the first position to the neutral position. Force applied by the biasing member to the hinged detent increases as the hinged detent transitions from the second orientation to the third orientation as the slide member transitions from the second position to the neutral position.

In an example, either A) the biasing member is compressed when the hinged detent transitions from the first orientation to the third orientation and the biasing member is compressed when the hinged detent transitions from the second orientation to the third orientation; or B) the biasing member is stretched when the hinged detent transitions from the first orientation to the third orientation and the biasing member is stretched when the hinged detent transitions from the second orientation to the third orientation.

In an example, the handle includes a gripping portion that extends transversely to the main body portion.

In an example, the slide member includes an annular sidewall, an engagement end, and an open end defining a central cavity. The biasing member has a first end received in the central cavity and a second end that is external of the slide member, at least when, the main body portion is in the open and closed orientations. The engagement end pivotally engages the hinged detent.

In an example, a slide member is slidably carried within a central cavity of the main body portion. The slide member includes a groove pivotally engaging the hinged detent for pivotal motion therebetween about a slide member axis that is offset from the detent axis.

In an example, the handle axis, the slide member axis and the detent axis are parallel to one another.

In an example, the main body portion is connected to the base member by a hinge pin. The hinged detent is received in a groove formed in the base member.

In an example, the base member includes a first groove that receives a first pivot portion of the hinged detent, the first pivot portion being insertable into the first groove non-parallel to the detent axis.

In an example, a slide member is slidably carried by the main body portion. The slide member includes a second groove pivotally engaged by a second pivot portion of the hinged detent for pivotal motion therebetween about a slide member axis that is offset from the detent axis. The biasing member acts between the main body portion and the slide member. The second pivot portion is insertable into the second groove non-parallel to the slide member axis.

In an example, the base member includes an operator shaft receiving cavity configured for receiving an operator shaft of a casement operator along a mounting axis that is generally perpendicular to the handle and detent axes.

In an example, a sidewall of the operator shaft receiving cavity includes at least one groove or projection for coupling the base member to a casement operator shaft.

In an example, the slide member engages the main body portion to prevent rotation of the slide member relative to the main body portion.

In an example, the slide member slides linearly between the first position and the neutral position as well as linearly between the neutral position and the second position.

In an example, the biasing member applies force along a biasing member axis. The hinged detent has a third orientation that is a neutral orientation between the first and second orientations, the third orientation being when the hinged detent is positioned relative to the main body and the base member such that an axis that is perpendicular to and intersecting the detent axis and the slide member axis is parallel to the biasing member axis.

In an example, the hinged detent is more rigid than the biasing member such that transitioning of the main body portion between the open and closed orientations deforms the biasing member rather than the hinged detent.

In one example, a method of operating a casement operator crank as outlined above is provided. The method includes pivoting the main body portion from the closed orientation to the open orientation by applying a torque to the main body portion to overcome the biasing generated by the biasing member.

In an example, the method includes pivoting the main body portion from the open orientation to the closed orientation by applying a torque to the main body portion to overcome the biasing generated by the biasing member.

In an example, pivoting the main body portion from the closed orientation to the open orientation includes first resiliently deforming the biasing member to increase the force generated by the biasing member. Then, after sufficient pivotal motion of the main body, decreasing the amount of resilient deformation of the biasing member to decrease the force generated by the biasing member.

In an example, the sufficient pivotal motion is such that the torque generated by the force of the biasing member transitions to biasing the main body portion towards the open orientation.

In one example, a method of operating a casement operator crank as outlined above is provided. The method includes pivoting the main body portion from the open orientation to the closed orientation by applying a torque to the main body portion to overcome the biasing generated by the biasing member.

In an example, the method further includes pivoting the main body portion from the closed orientation to the open orientation by applying a torque to the main body portion to overcome the biasing generated by the biasing member.

In an example, pivoting the main body portion from the open orientation to the closed orientation includes first resiliently deforming the biasing member to increase the force generated by the biasing member. Then, after sufficient pivotal motion of the main body, decreasing the amount of resilient deformation of the biasing member to decrease the force generated by the biasing member.

In an example, the sufficient pivotal motion is such that the torque generated by the force of the biasing member transitions to biasing the main body portion towards the closed orientation.

In one example, a casement operator crank including a base member, a handle, a hinged detent, and a resilient biasing member is provided.

The base member is configured to connect to a casement operator.

The handle has a main body portion defining an internal cavity. The main body portion pivotally connects to the base member for rotation about a handle axis between an open orientation and a closed orientation.

The hinged detent pivotally engages the base member for rotation about a detent axis between a first orientation relative to the main body portion and a second orientation relative to the main body portion. The hinged detent is in the first orientation when the main body portion is in the open orientation. The hinged detent is in the second orientation when the main body portion is in the closed orientation. The hinged detent has a neutral orientation through which the hinged detent passes as it transitions between the first and second orientations.

The resilient biasing member acts between the hinged detent and the handle. The resilient biasing member and hinged detent act to:

a) generate torque on the main body portion in a first direction about the handle axis biasing the main body portion toward the open orientation when the hinged detent is offset from the neutral orientation towards the first orientation; and b) generate torque on the main body portion in a second direction about the handle axis biasing the main body portion toward the closed orientation when the hinged detent is offset from the neutral orientation towards the second orientation.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
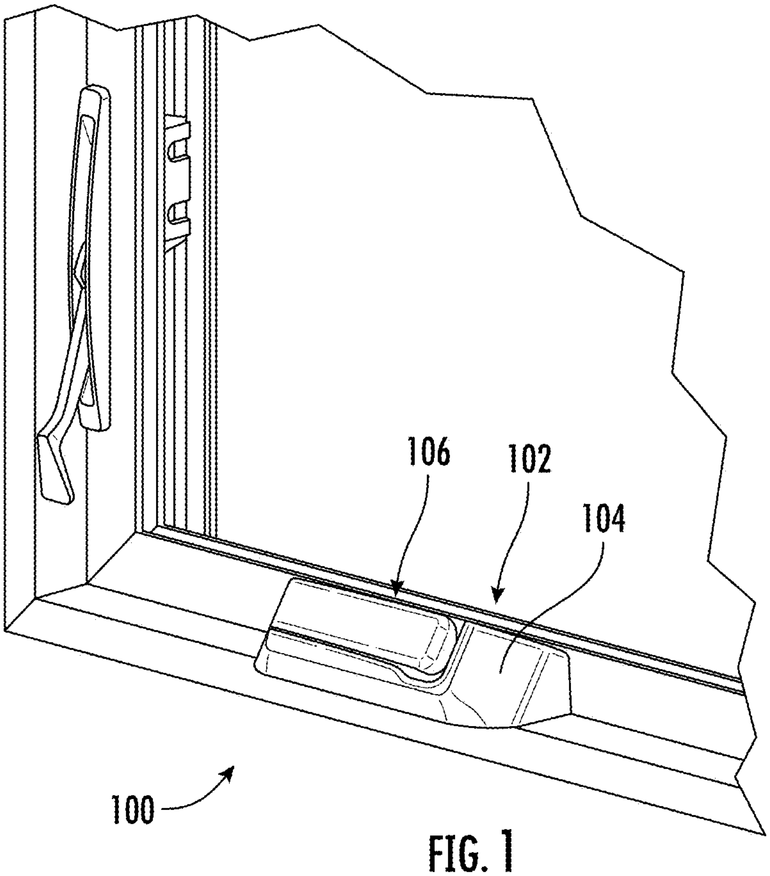
FIG. 1 is a partial perspective illustration of a casement window illustrating the operator assembly with the crank thereof in a closed orientation.
Figure 2:
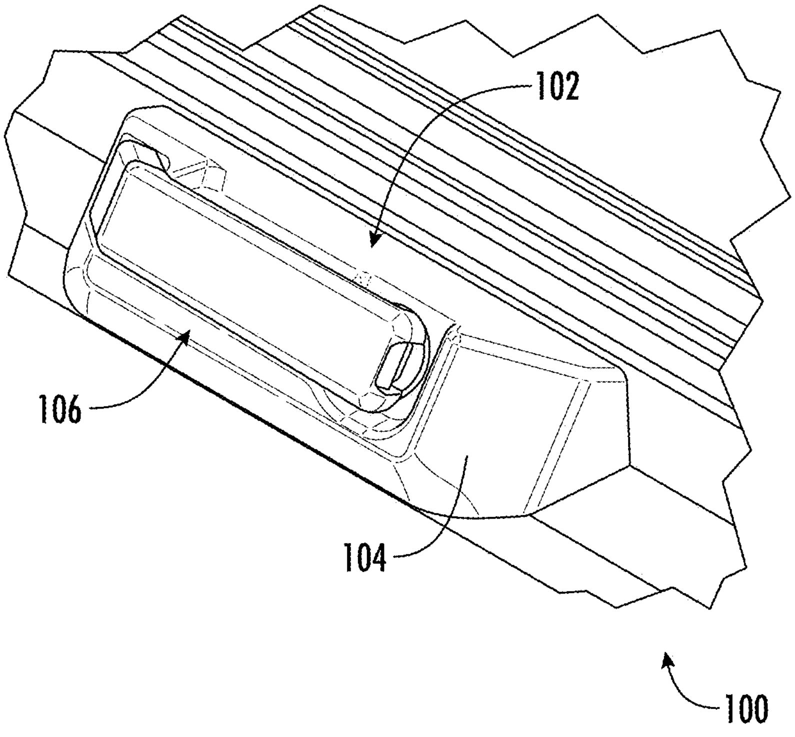
FIG. 2 is an enlarged illustration of the operator assembly with the crank thereof in a closed orientation.

FIGS. 1 and 2 illustrate a portion of a casement window 100 that includes an operator arrangement 102 that includes an operator 104 and an operator crank 106. The operator crank 106 is illustrated in a closed orientation in which the crank 106 is generally prevented from rotation preventing the operator arrangement 102 from opening or closing the window 100.

Figure 3:
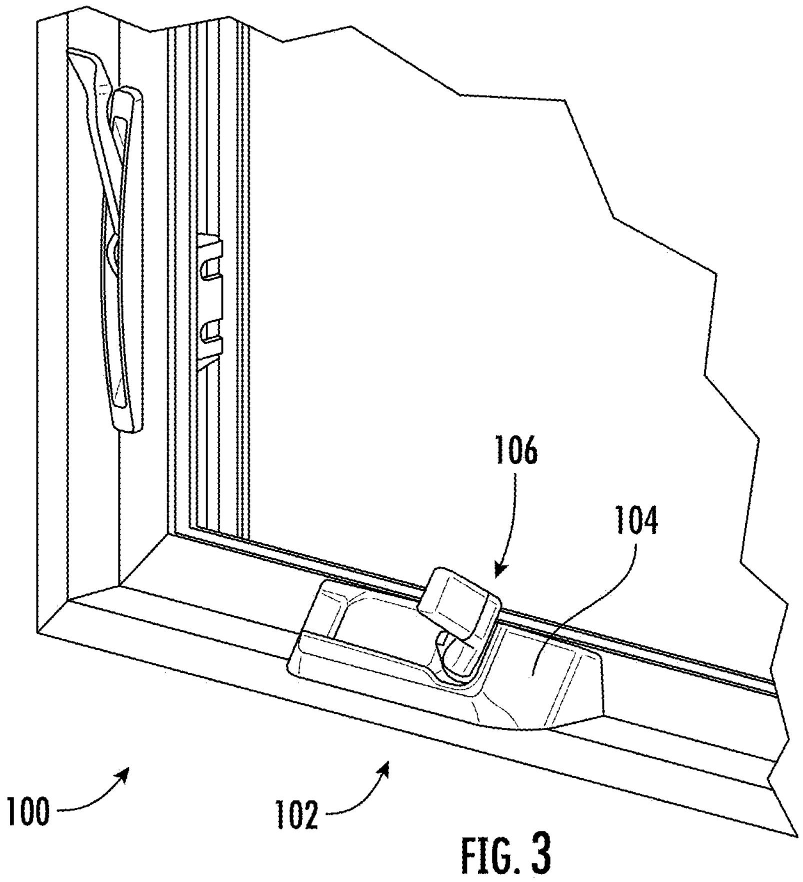
FIG. 3 is a partial perspective illustration of the casement window illustrating the operator assembly with the crank thereof in the open orientation.
Figure 4:
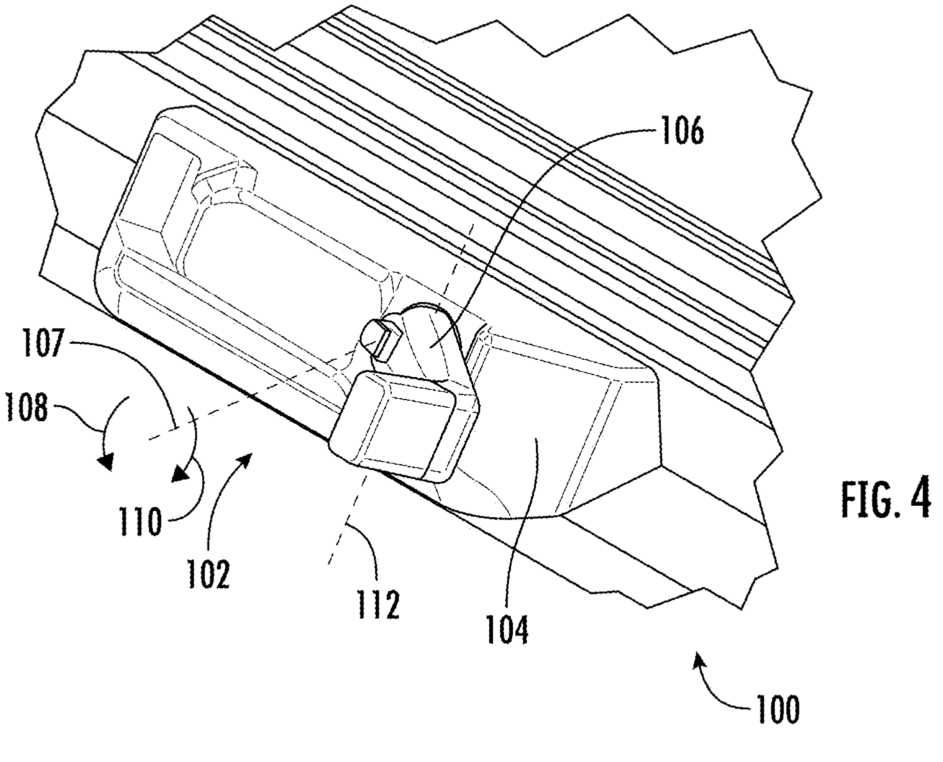
FIG. 4 is an enlarged illustration of the operator assembly with the crank thereof in a open orientation.

FIGS. 3 and 4 illustrate the operator crank 106 in an open orientation in which the crank 106 can be rotated about axis 107 in a first direction 108 to open the window 100 and in a second opposite direction 110 to close the window 100.

As will be described below, a handle 120 of the crank 106 is pivotable about handle axis 112 between the open and closed orientations.

With reference to FIGS. 5-8, the handle 120 is pivotally attached to base member 122, which in this example forms a splined connector. The handle 120 is rotatable about handle axis 112 relative to base member 122 to transition between the open orientation (FIGS. 3, 4 and 6) and the closed orientation (FIGS. 1, 2, and 5) relative to base member 122. In particular, rotation about handle axis 112 in a first direction transitions from the open orientation to the closed orientation and rotation about handle axis 112 in an opposite, second direction transitions from the closed orientation to the open orientation.

The base member 122 is configured to operably attach the crank 106 to a window operator and typically to an operator shaft of the window operator. The connection is such that rotation of the crank via manipulation of handle 120 rotates the operator shaft and the window operator. In this example, the base member 122 includes an operator shaft receiving cavity 124 configured to receive an operator shaft. The receiving cavity 124 defines a receiving cavity axis 126 along which the base member 122 would be mounted to the operator shaft.

Typically, this axis 126 would be parallel to axis 107 about which the crank rotates when opening and closing the window 100.

In this example, the inner surface of the cavity 124 is splined transfer rotational motion of the crank 106 to the operator shaft. The operator shaft would have a mating outer periphery. Other arrangements such as one or more grooves or radial projections may be provided. Non-circular inner peripheries may be used such as square peripheries that mate with a square periphery of the operator shaft.

To further secure the base member 122 to the operator shaft, a set screw 128 is provided that can be radially engaged with the operator shaft. The set screw 128 could be used to prevent the base member 122 from rotating relative to the operator shaft and/or to prevent or inhibit axially removing the base member 122 from the operator shaft.

To pivotally attach the handle 120 to the base member 122, a hinge pin 130 is used. The hinge pin 130 defines handle axis 112. However, other connections are contemplated such as projections on either the handle 120 or the base member 122 that are received in recesses in the other component.

Figure 8:
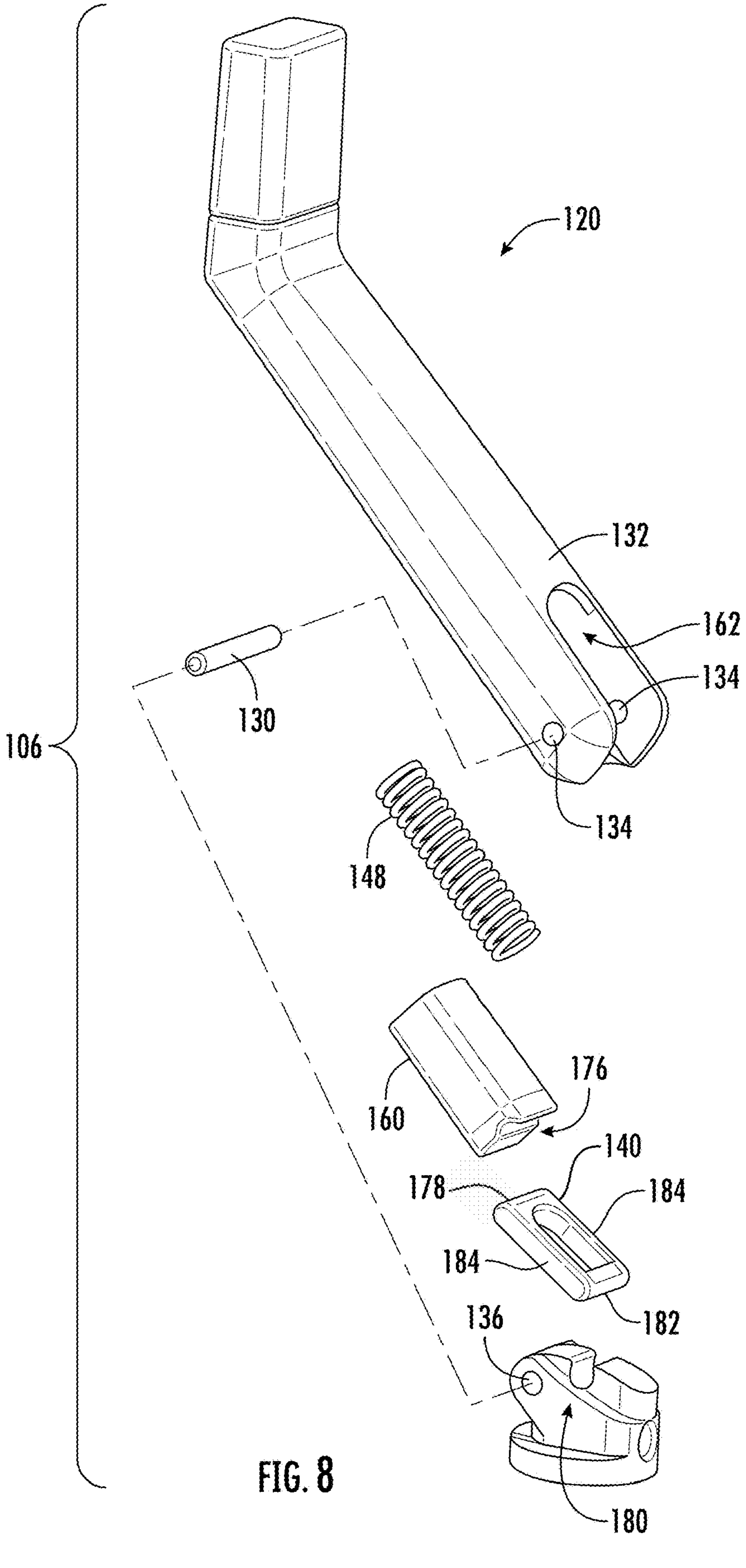
FIG. 8 is a perspective exploded illustration of the operator crank.

In this example and with reference to FIG. 8, a main body portion 132 of the handle 120 includes apertures 134 proximate an end thereof that receives hinge pin 130 therethrough. Base member 122 includes a corresponding aperture 136 that receives hinge pin 130.

Figure 5:
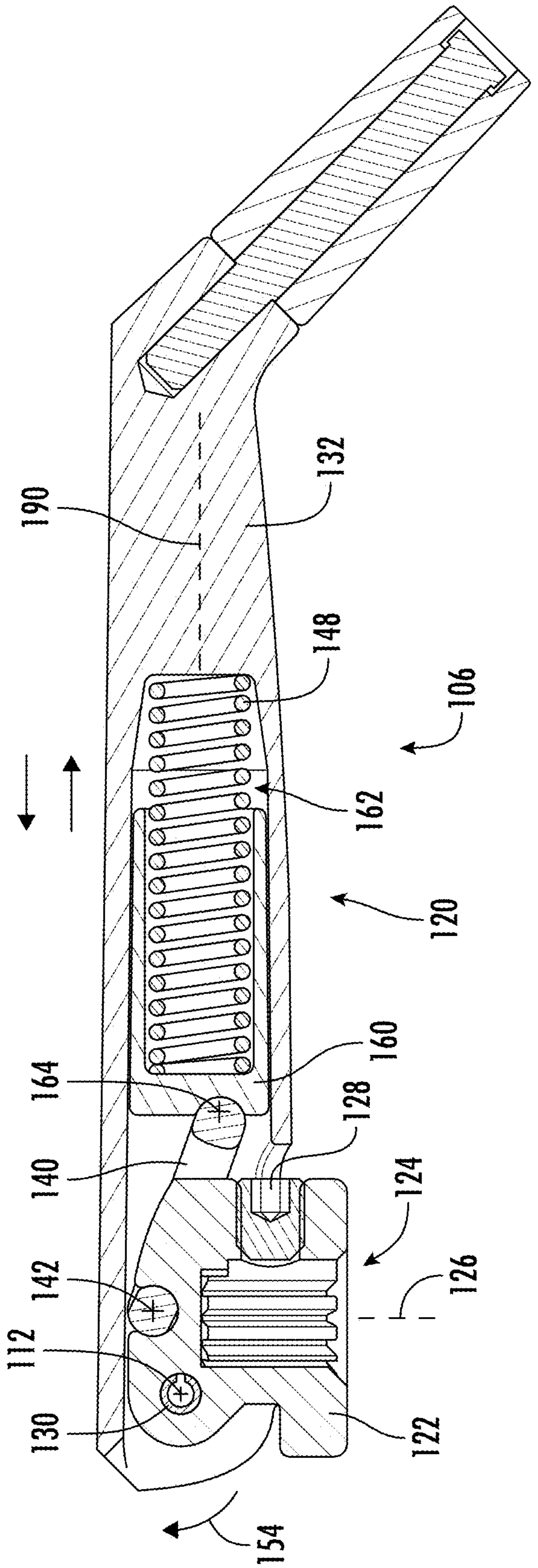
FIG. 5 is a cross-sectional illustration of the operator crank of the operator assembly illustrated in the closed orientation.
Figure 6:
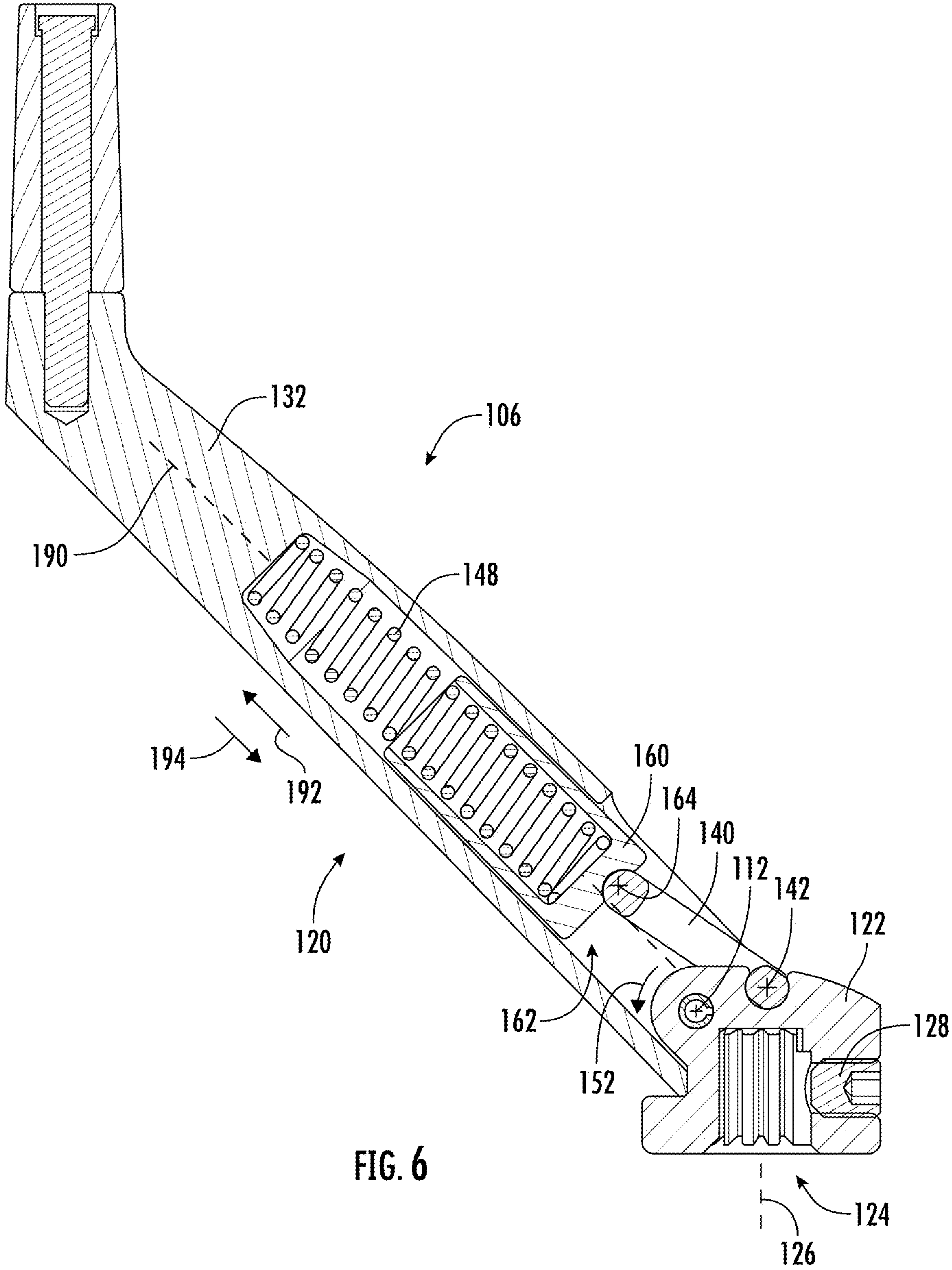
FIG. 6 is a cross-sectional illustration of the operator crank of the operator assembly illustrated in the open orientation.

The crank 106 is configured with an over-center arrangement such that the handle 120 is biased to be maintained in the closed orientation (see FIG. 5) or the open orientation (See FIG. 6).

In particular, the crank 106 includes a hinged detent 140 pivotally engaged with the base member 122 for rotation about a detent axis 142. The hinged detent 140 rotates between first and second orientations relative to the main body portion 132 and base member 122. The hinged detent 140 is in the first orientation (FIG. 6) when the main body portion 132 is in the open orientation and the hinged detent 140 is in the second orientation (FIG. 5) when the main body portion 132 is in the closed orientation.

In this example, detent axis 142 is parallel to and offset from handle axis 112.

A resilient biasing member 148 acts between the hinged detent 140 and the handle 120 and particularly the main body portion 132 to apply a force to the hinged detent 140. Due to the orientation of the hinged detent 140 relative to the main body portion 132 in the first orientation, the force applied to the hinged detent 140 by biasing member 148 when the hinged detent 140 is in the first orientation a first torque 152 in a first direction about handle axis 112 is generated that biases the handle 120 to remain in the open orientation. Due to the orientation of the hinged detent 140 relative to the main body portion 132 in the second orientation, the force applied to the hinged detent 140 by biasing member 148 a second torque 154 in a second direction about handle axis 112 is generated that biases the handle 120 to remain in the closed orientation.

When a user attempts to transition the handle 120 from the open orientation or from the closed orientation, the corresponding torques 152, 154 inhibit but do not prevent such motion of the handle 120 and particularly main body portion 132.

In this example, a slide member 160 is slidably carried within a central cavity 162 of the handle 120 and particularly main body portion 132. The slide member 160 operably inter engages the hinged detent 140 with the biasing member 148.

In this example, the slide member 160 is pivotally engaged with the hinged detent 140 for relative pivotal motion therebetween about a slide member axis 164. The slide member axis 164, in this example, is parallel to handle axis 112 and detent axis 142.

The biasing member 148 operably acts between the slide member 160 and the handle 120 and particularly main body portion 132.

The slide member 160, in this example, includes an annular sidewall 166, an engagement end 168 and an open end 170. The annular sidewall 166 defines a biasing member receiving cavity 172. The biasing member 148 is axially received in the biasing member receiving cavity 172. The biasing member 148 is configured (e.g. sufficiently long) to extend axially out of the slide member 160 when in a relaxed undeformed state. When inserted, one end of the biasing member abuts an abutment 173 provided by engagement end 168 and the other end engages an abutment 174 formed in cavity 162 of the main body portion 132.

Engagement end 168 includes a groove 176 that receives pivot portion 178 of the hinged detent 140. The pivot portion 178 slides relative to the surface defining groove 176 as the hinged detent 140 transitions between the first and second orientations.

In this example, the groove 176 is configured to receive the pivot portion 178 in a direction that is non-parallel to the slide member axis 164.

Figure 9:
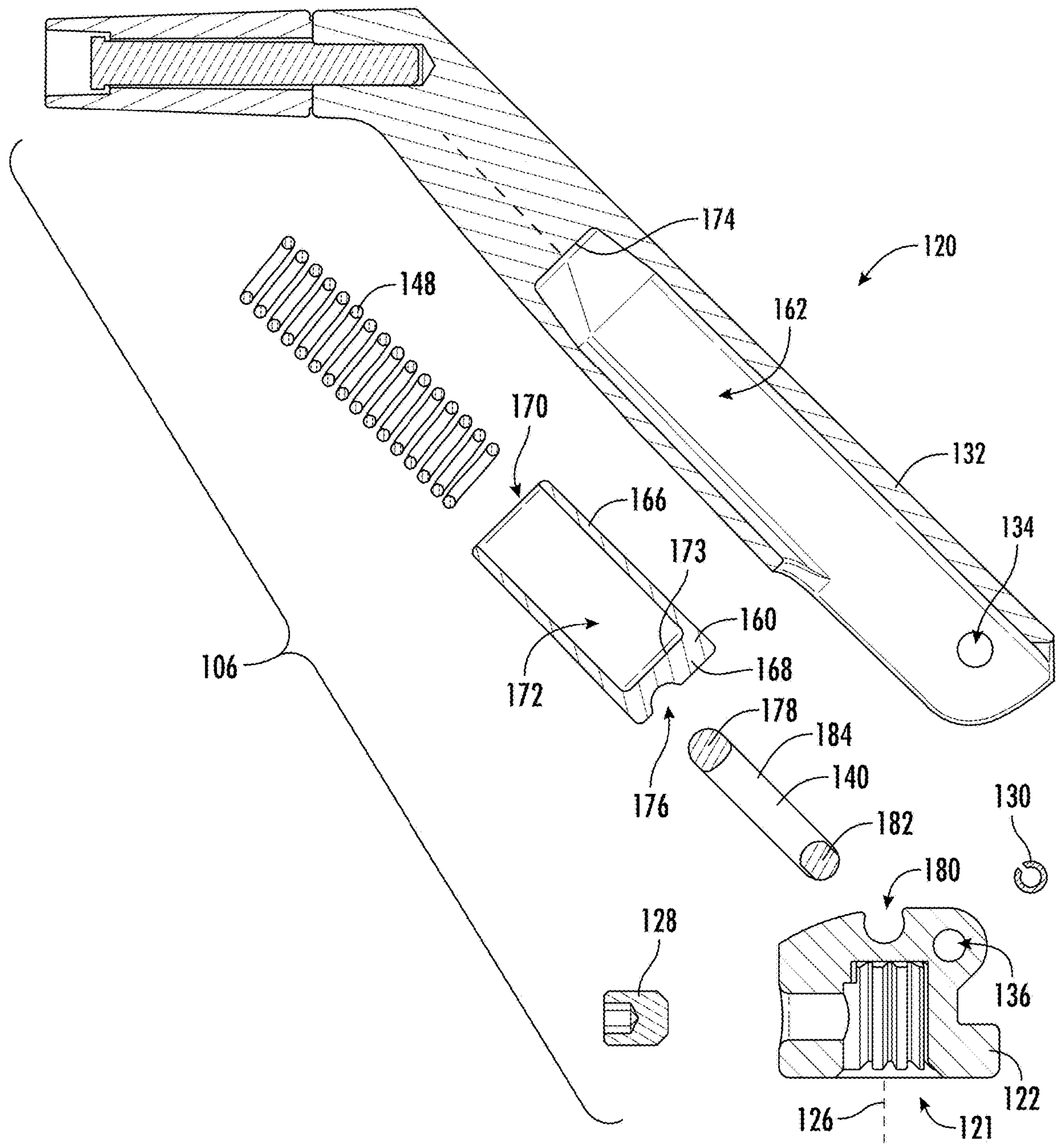
FIG. 9 is a cross-sectional exploded illustration of the operator crank.

The base member 122 includes a groove 180 that receives pivot portion 182 of the hinged detent 140. In this example, the groove 180 is configured to receive the pivot portion 182 in a direction that is non-parallel to detent axis 142. As illustrated in FIG. 9, the groove 180 as a C-shape and the pivot portion 182 has a reduced thickness that is configured to pass through the mouth of the C-shape.

Pivot portions 178, 182 are axially spaced apart by legs 184.

Pivot portions 178, 182 have curved distal ends that facilitate the rotational movement of the hinged detent 140 relative to the base member 122 and the slide member 160.

Figure 7:
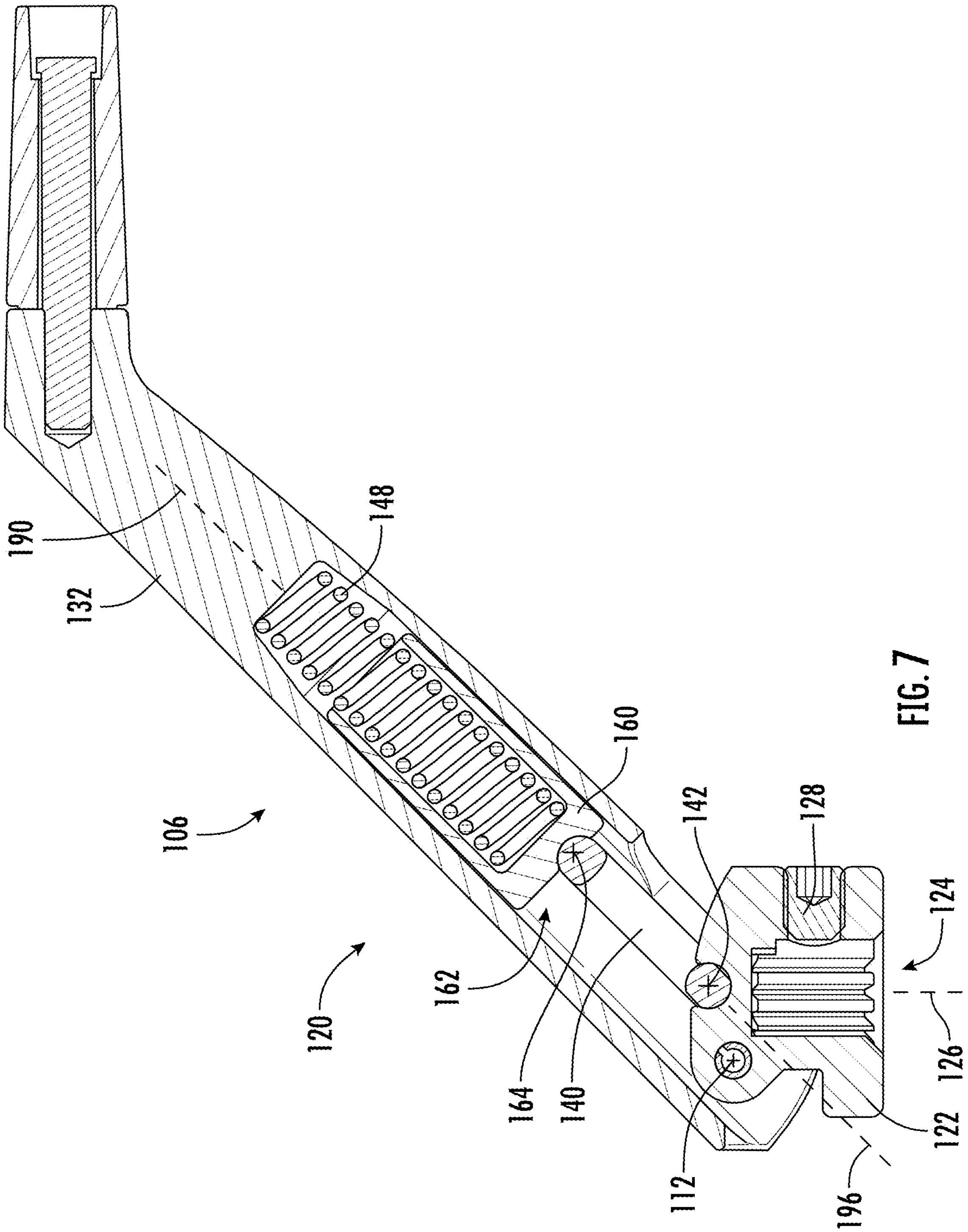
FIG. 7 is a cross-sectional illustration of the operator crank of the operator assembly illustrated in a neutral orientation.

As the handle 120 pivots between the open and closed orientations, the orientation of the hinged detent 140 relative to the main body portion 132 changes (see e.g. differences in FIGS. 5-7 as the main body portion 132 pivots about handle axis 112 while hinged detent 140 pivots about detent axis 142. This change in orientation, e.g. from closed orientation of FIG. 5 to the open orientation of FIG. 6, causes a change in the torque applied to the main body portion 132 due to the biasing member 148 and hinged detent 140.

As the handle 120 transitions between these orientations, the handle 120 passes through a neutral position. The neutral position for this example is illustrated in FIG. 7. In this example, the force applied to the hinged detent 140 is such that no torque is applied to the main body portion 132 about handle axis 112. However, if the handle 120 moves angularly toward the closed orientation about axis 112, the biasing member 148 and hinged detent will generate torque 154 biasing the handle 120 toward the closed orientation. If handle 120 moves angularly toward the open position about axis 112, the biasing member 148 and hinged detent 140 will generate torque 152 biasing the handle 120 toward the open orientation.

As the hinged detent 140 transitions between these orientations, the hinged detent 140 deforms the resilient biasing member 148. As the hinged detent transitions from the closed orientation in FIG. 5 to the neutral position in FIG. 7, the hinged detent 140 compresses the resilient biasing member 148 progressively increasing the amount of force provided by biasing member 148. After passing through the neutral position, the hinged detent 140 starts to pivot such that the biasing member 148 is allowed to resiliently extend back towards its relaxed state progressively reducing the amount of force provided by the biasing member. When transitioning from the open orientation to the closed orientation, the same progression applies.

In this example, the slide member 160 has first, second and third positions relative to the main body portion 132 along sliding axis 190. The first position corresponds to when the handle 120 is in the open orientation, the second position corresponds to when the handle 120 is in the closed orientation, and the third position corresponds to when the handle 120 is in the neutral position. The first and second positions may be the same axial locations along slide axis 190 while the third position is at a different axial location from both the first and second positions. In this example, the neutral position is when the slide member 160 is positioned its furthest into cavity 162.

As such, during the transition between the open and closed orientations, the slide member 160 slides axially in a first direction 192 from the first position along axis 190 further into cavity 162 until reaching the third position along axis 190 and then slides in a second opposite direction 194 from the third position along axis 190 towards the second position.

As the slide member 160 is positioned the deepest into cavity 162 in the neutral position, biasing member 148 is compressed the most and thus provides the largest amount of force in this position. However, due to the orientation of biasing member 148 and hinged detent 140, no torque is applied to main body portion 132 about axis 112. In one example, a hypothetical axis 196 defined by being perpendicular to and intersecting axis 142 and axis 164 is parallel to slide axis 190 in the neutral position as illustrated in FIG. 7.

While the prior example compresses biasing member 148, it is contemplated that the biasing member 148 could be stretched when transitioning from the first or second positions toward the neutral position.

Preferably, the biasing member 148 is less rigid than the hinged detent 140 such that in operation the biasing member 148 resiliently deforms before the hinged detent 140.

The use of the biasing member in combination with the hinged detent 140 reduces where on the hinged detent 140 as compared to if the two components were provided by a single component, e.g. a resiliently deformable hinged detent member 140. Further, this arrangement with a pivoting hinged detent 140 that is biased by biasing member 148 allows for one action manipulation between the open and closed orientations. This is opposed to designs that use mechanical latches or catches that lock the handle in the open, closed or both the open and closed orientations that require actuation of the latch or catch first and then pivoting of handle 120 between the open and closed orientations. Other arrangements can use interference arrangements where a detent extends into and out of one or more different recesses in a first orientation such as the open orientation and a second recess in a second orientation such as the closed orientation. However, these interference configurations generate a lot of friction which can suffer from wear due to cyclical operation.

The slide member 160 may have a non-circular periphery and the cavity 162 may have a mating shape such that the slide member 160 does not rotate within cavity 162. This can assist in orienting axes 164 and 142 parallel to one another for assembly purposes.

Figure 10:
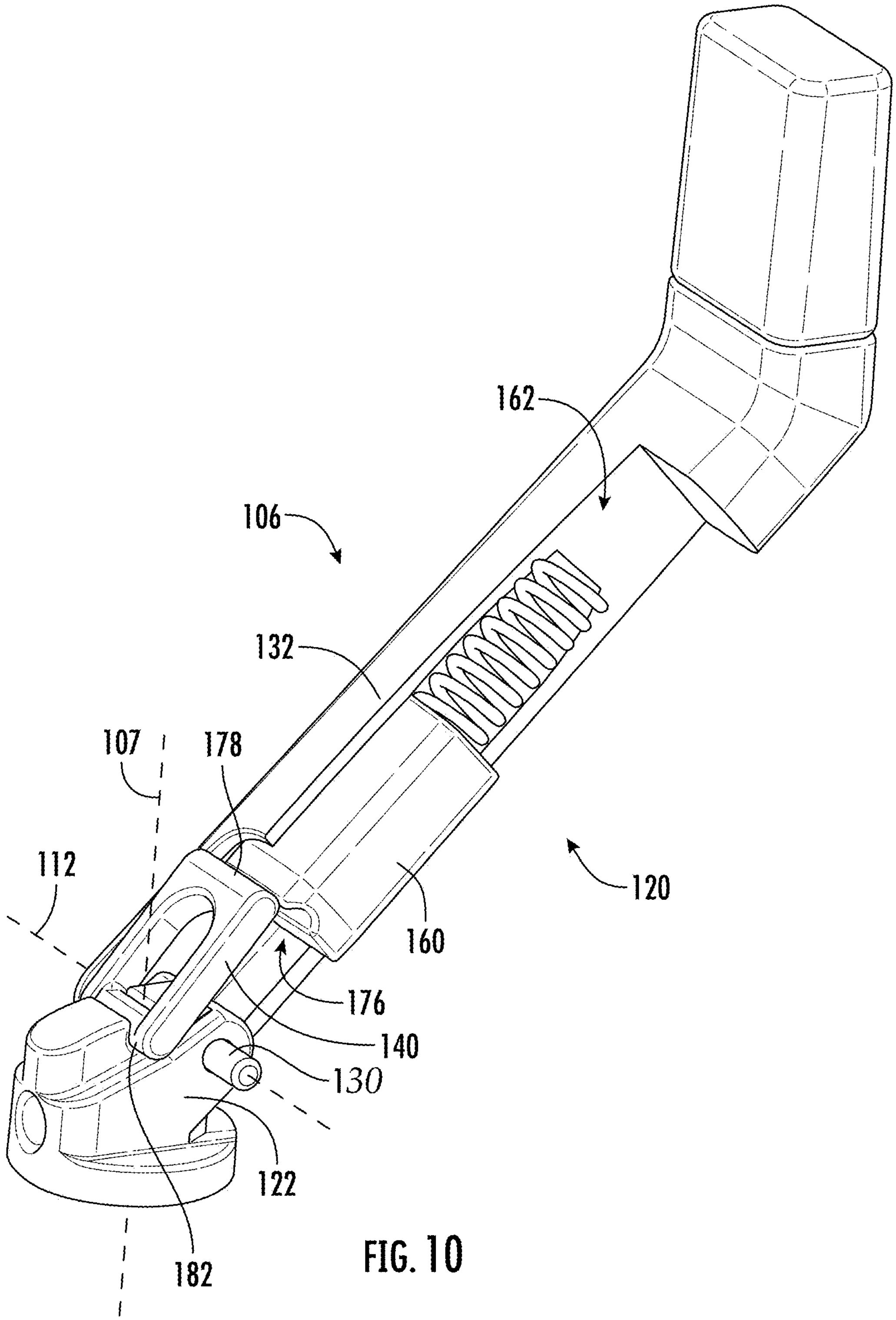
FIG. 10 is a partial cut-away illustration of the operator crank prior to being fully assembled.

FIG. 10 illustrates the crank 106 prior to full assembly. In this illustration, the hinged detent 140 has been mounted with pivot portion 182 inserted into grove 180 of base member 122. However, pivot portion 178 has not been inserted into groove 176. Here, the user can push slide member 160 axially into cavity 162 until pivot portion 178 can be engaged into groove 176.

In use, the user will grasp handle 120 and then pivot the handle 120 about axis 112 by applying torque to the handle to overcome the biasing torque provided by the biasing member 148 through hinged detent 140. This occurs when transitioning from the open orientation to the closed orientation and from the closed orientation to the open orientation.

In some instances, the open and closed orientations may allow for some play in the pivoting of the handle 120 such that a range of motion of the handle 120 within the open or closed orientation is permitted without any biasing being applied to the handle 120 by the biasing member 148.

In this example, during all manipulations between the open and closed orientations, all deformation of the biasing member 148 is resilient deformation such that it will return to its undeformed (or lesser deformed) configurations in the first and second positions as compared to the neutral positions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A casement operator crank comprising:

a base member configured to connect to a casement operator;

a handle having a main body portion, the main body portion pivotally connected to the base member for rotation about a handle axis between an open orientation and a closed orientation;

a hinged detent pivotally engaged with the base member for rotation about a detent axis between a first orientation relative to the main body portion and a second orientation relative to the main body portion, the hinged detent being in the first orientation when the main body portion is in the open orientation, the hinged detent being in the second orientation when the main body portion is in the closed orientation;

a resilient biasing member acting between the hinged detent and the handle, the biasing member and hinged detent operably:

a) biasing the main body portion toward the open orientation about the handle axis when the main body portion is in the open orientation; and b) biasing the main body portion toward the closed orientation about the handle axis when the main body portion is in the closed orientation.

2. The casement operator crank of claim 1, wherein the biasing member and hinged detent operably:

a) generate torque on the main body portion in a first direction about the handle axis biasing the main body portion toward the open orientation when the main body portion is moved away from the open orientation; and b) generate torque on the main body portion in a second direction about the handle axis biasing the main body portion toward the closed orientation when the main body portion is moved away from the closed orientation.

3. The casement operator crank of claim 2, wherein the main body portion rotates about the handle axis in the second direction when transitioning from the open orientation to the closed orientation and the main body portion rotates about the handle axis in the first direction when transitioning from the closed orientation to the open orientation.

4. The casement operator crank of claim 1, further comprising a slide member slidably carried within a central cavity of the main body portion, the slide member pivotally engaged with the hinged detent for pivotal motion therebetween about a slide member axis that is offset from the detent axis, the biasing member acting between the main body portion and the slide member; and the slide member has:

a first position relative to the main body portion when the main body portion is in the open orientation;

a second position relative to the main body portion when the main body portion is in the closed orientation;

a neutral position relative to the main body portion, the slide member passing through the neutral position when the main body portion transitions between the open and closed orientations.

5. The casement operator crank of claim 4, wherein when in the neutral position, the biasing member provides a maximum amount of force to the hinged detent but no torque is applied to the main body portion.

6. The casement operator crank of claim 4, wherein:
the hinged detent has a third orientation relative to the main body portion that corresponds to when the slide member is in the third position;
force applied by the biasing member to the hinged detent increases as the hinged detent transitions from the first orientation to the third orientation as the slide member transitions from the first position to the neutral position;
force applied by the biasing member to the hinged detent increases as the hinged detent transitions from the second orientation to the third orientation as the slide member transitions from the second position to the neutral position.

7. The casement operator crank of claim 6, wherein either:
the biasing member is compressed when the hinged detent transitions from the first orientation to the third orientation and the biasing member is compressed when the hinged detent transitions from the second orientation to the third orientation; or
the biasing member is stretched when the hinged detent transitions from the first orientation to the third orientation and the biasing member is stretched when the hinged detent transitions from the second orientation to the third orientation.

8. The casement operator crank of claim 4, wherein the slide member includes an annular sidewall, an engagement end, and an open end defining a central cavity, the biasing member having a first end received in the central cavity and a second end that is external of the slide member, at least when, the main body portion is in the open and closed orientations, the engagement end pivotally engages the hinged detent.

9. The casement operator crank of claim 4, wherein the slide member engages the main body portion to prevent rotation of the slide member relative to the main body portion.

10. The casement operator crank of claim 4, wherein the slide member slides linearly between the first position and the neutral position as well as linearly between the neutral position and the second position.

11. The casement operator crank of claim 1, wherein the handle includes a gripping portion that extends transversely to the main body portion.

12. The casement operator crank of claim 1, further comprising:
a slide member slidably carried within a central cavity of the main body portion, the slide member including a groove pivotally engaging the hinged detent for pivotal motion therebetween about a slide member axis that is offset from the detent axis.

13. The casement operator crank of claim 12, wherein the handle axis, the slide member axis and the detent axis are parallel to one another.

14. The casement operator crank of claim 12, wherein the main body portion is connected to the base member by a hinge pin, the hinged detent is received in a groove formed in the base member.

15. The casement operator crank of claim 12, wherein the biasing member applies force along a biasing member axis, wherein the hinged detent has a third orientation being a neutral orientation between the first and second orientations, the third orientation being when the hinged detent is positioned relative to the main body and the base member such that an axis that is perpendicular to and intersecting the detent axis and the slide member axis is parallel to the biasing member axis.

16. The casement operator crank of claim 1, wherein the base member includes a first groove that receives a first pivot portion of the hinged detent, the first pivot portion being insertable into the first groove non-parallel to the detent axis.

17. The casement operator crank of claim 16, further including a slide member slidably carried by the main body portion, the slide member including a second groove pivotally engaged a second pivot portion of the hinged detent for pivotal motion therebetween about a slide member axis that is offset from the detent axis, the biasing member acting between the main body portion and the slide member, the second pivot portion being insertable into the second groove non-parallel to the slide member axis.

18. The casement operator of claim 1, wherein the base member includes an operator shaft receiving cavity configured for receiving an operator shaft of a casement operator along a mounting axis that is generally perpendicular to the handle and detent axes.

19. The casement operator crank of claim 18, wherein a sidewall of the operator shaft receiving cavity includes at least one groove or projection for coupling the base member to a casement operator shaft.

20. The casement operator crank of claim 1, wherein the hinged detent is more rigid than the biasing member such that transitioning of the main body portion between the open and closed orientations deforms the biasing member rather than the hinged detent.

21. A method of operating a casement operator crank of claim 1 comprising:
pivoting the main body portion from the closed orientation to the open orientation by applying a torque to the main body portion to overcome the biasing generated by the biasing member.

22. The method of claim 21, further comprising:
pivoting the main body portion from the open orientation to the closed orientation by applying a torque to the main body portion to overcome the biasing generated by the biasing member.

23. The method of claim 21, wherein pivoting the main body portion from the closed orientation to the open orientation includes first resiliently deforming the biasing member to increase the force generated by the biasing member and then after sufficient pivotal motion of the main body, decreasing the amount of resilient deformation of the biasing member to decrease the force generated by the biasing member.

24. The method of claim 23, wherein the sufficient pivotal motion is such that the torque generated by the force of the biasing member transitions to biasing the main body portion towards the open orientation.

25. A method of operating a casement operator crank of claim 1 comprising:
pivoting the main body portion from the open orientation to the closed orientation by applying a torque to the main body portion to overcome the biasing generated by the biasing member.

26. The method of claim 25, further comprising:
pivoting the main body portion from the closed orientation to the open orientation by applying a torque to the main body portion to overcome the biasing generated by the biasing member.

27. The method of claim 25, wherein pivoting the main body portion from the open orientation to the closed orientation includes first resiliently deforming the biasing member to increase the force generated by the biasing member and then after sufficient pivotal motion of the main body, decreasing the amount of resilient deformation of the biasing member to decrease the force generated by the biasing member.

28. The method of claim 27, wherein the sufficient pivotal motion is such that the torque generated by the force of the biasing member transitions to biasing the main body portion towards the closed orientation.

29. A casement operator crank comprising:

a base member configured to connect to a casement operator;

a handle having a main body portion defining an internal cavity, the main body portion pivotally connected to the base member for rotation about a handle axis between an open orientation and a closed orientation;

a hinged detent pivotally engaged with the base member for rotation about a detent axis between a first orientation relative to the main body portion and a second orientation relative to the main body portion, the hinged detent being in the first orientation when the main body portion is in the open orientation, the hinged detent being in the second orientation when the main body portion is in the closed orientation, the hinged detent having a neutral orientation through which the hinged detent passes as it transitions between the first and second orientations;

a resilient biasing member acting between the hinged detent and the handle, the resilient biasing member and hinged detent acting to:

a) generate torque on the main body portion in a first direction about the handle axis biasing the main body portion toward the open orientation when the hinged detent is offset from the neutral orientation towards the first orientation; and b) generate torque on the main body portion in a second direction about the handle axis biasing the main body portion toward the closed orientation when the hinged detent is offset from the neutral orientation towards the second orientation.

* * * * *